Feb. 22, 1949.   L. R. BUCKENDALE   2,462,067
RESILIENT LUBRICANT SEAL
Filed Dec. 1, 1944   2 Sheets-Sheet 1
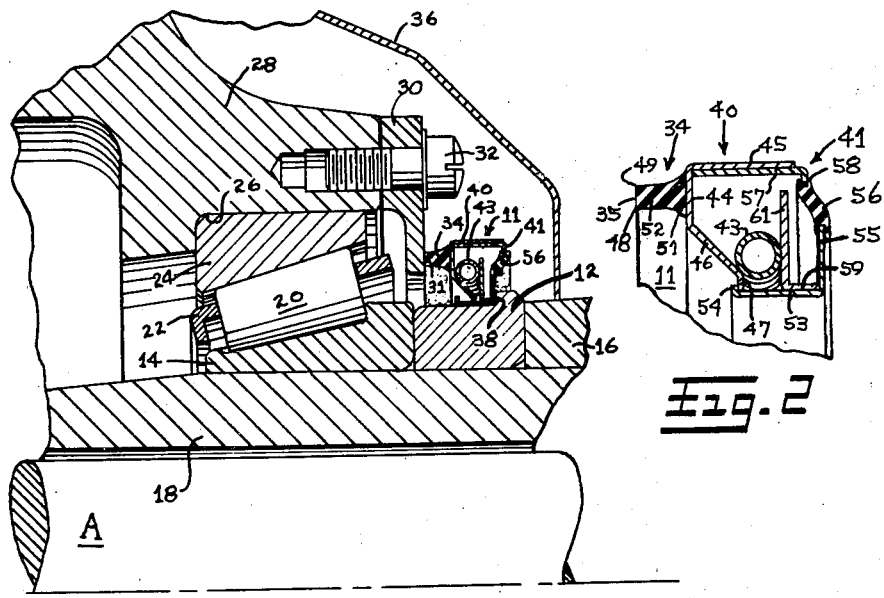
Fig. 1
Fig. 2
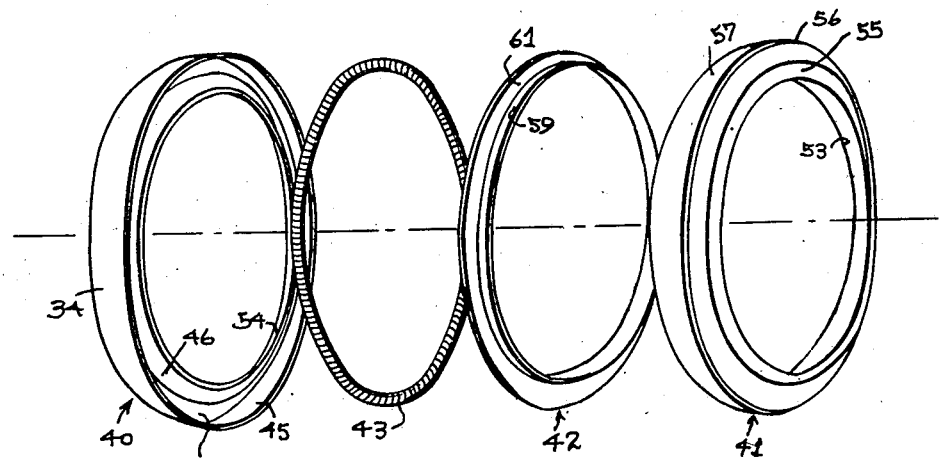
Fig. 3
INVENTOR.
L. R. BUCKENDALE
BY Strauch & Hoffman
ATTORNEYS.

Feb. 22, 1949.  L. R. BUCKENDALE  2,462,067
RESILIENT LUBRICANT SEAL
Filed Dec. 1, 1944  2 Sheets-Sheet 2

INVENTOR.
L.R. BUCKENDALE
BY Trauch & Hoffman
ATTORNEYS.

Patented Feb. 22, 1949

2,462,067

UNITED STATES PATENT OFFICE 2,462,067

RESILIENT LUBRICANT SEAL

Lawrence R. Buckendale, Detroit, Mich., assignor to The Timken-Detroit Axle Company, Detroit, Mich., a corporation of Ohio Application December 1, 1944, Serial No. 566,171

5 Claims. (Cl. 286—11)

This invention relates to means for providing a fluid-tight seal between relatively rotatable parts, and more particularly to a fluid-tight seal between relatively rotatable vehicle axle parts such, for example, as a wheel hub and an axle spindle or housing.

The present invention embodies the broad principles of the flexible seal disclosed and claimed in my United States Letters Patent No. 2,391,007, issued December 18, 1945 and includes certain improvements thereover.

In automotive vehicles the ground engaging wheels are ordinarily supported on their axles by means of 'ubricated bearings in a well known manner. Seals constructed of suitable material are required to prevent the escape of lubricant from the interior of the axle assembly to the brake drum and also to prevent the entrance of moisture and abrasive substances from without.

Over a period of many years workers in the automotive art have attempted to perfect a simple, economical and effective seal to prevent leakage of lubricant from the bearing-containing space between the housing or spindle of an automotive axle and the hub of a wheel journalled on the axle, but these efforts have for various reasons met with on'y limited practical success.

Previously proposed sealing devices have often taken the form of an annular body of resilient material fixed to one of the relatively rotatable members, usually the axle spindle or housing, and having a sealing surface engaged with a corresponding surface on the other relatively rotatable member. Many of these seals have been of complicated and expensive construction invo'ving the use of such components as metal finger springs to compress them in sealing engagement against the rotating parts with which they cooperate. Some embody annular rubber seals which relay only upon their inherent resiliency for exerting sufficient sealing pressure, while others are provided with sponge material or the like between the sealing material and the supporting member to urge the sealing material into engagement with the sealing surface.

Bearing seals embodying finger springs or their equiva'ents, in axial compression, have been found unsatisfactory as the initial pressure of the seal against the sealing surface must be so great that the seal is worn rapidly necessitating frequent replacement. Seals utilizing only the inherent resiliency of the material of which they are made have been found inefficient due to their loss of radial flexure after a period of time.

A frequent cause of failure in previous seals has been that the torque occasioned by friction between the sealing surfaces causes the seal device to wind up and shorten thus relieving to some extent the sealing pressure. This has been found to be especially true in seals in which a sponge rubber material or the like is utilized to exert the sealing pressure since, when the unit pressure between the sealing surfaces is sufficient to form a satisfactory seal, the initial torquing movement of the rotating part tends to distort the sponge material. Even though the effectiveness of the sponge material may not be permanently affected immediately, the winding up shortens the effective length of the seal thus relieving the pressure and causing leakage.

In order to maintain an effective sea' over an extended period of service the device must have sufficient resistance to rotation and shear to avoid distortion and must also resist radial movements to avoid rounding off of the sealing surface. At the same time, it must have a sufficient flexibility in an axial d'rection to maintain a substantially uniform pressure at the sealing surface and substantially the same pressure uniformly around the sealing surface.

Some proposals have also been made to use a sealing device having a spring pressed annular body of metal as the sealing 'ip but these have been found to have very high frictional wear and I consider them unsatisfactory and inefficient.

It is acordingly a major object of the invention to provide a novel sealing device having an annular body of resilient material flexibly support'ng a sealing surface and which maintains constant and uniform unit pressure at the sealing surface under all operating conditions.

A further object of the invention resides in the provision of an improved sealing device including an annular sealing body of resi'ient material mounted on a support designed to exert a substantially constant axial pressure on the sealing body.

A still further object reside in the provision of an improved flu'd seal capable of a relatively great axial deformation without material variation in the unit pressure exerted on the sealing surface.

An additional object resides in the provision of an improved fluid seal so constructed that fluid lubricant, the escape of which is sought to be prevented, is permitted to enter the supporting structure of the seal to lubricate the mechanism of such supporting structure.

A further object of the invention is to provide a sealing device embodying a radially and axially flexible annulus having a relatively narrow smooth continuous sealing surface adapted to engage a corresponding surface on a relatively rotatable part and a novel mounting for the annulus including supplementary means constantly urging said annu'us in a sealing direction. Preferably the supplementary means is a resilient means.

A further object of the invention is to provide a sealing device having a smooth continuous sealing face and novel compensatory or follow-up means for maintaining constant sealing pressure at said face.

It is another object of the invention to provide a novel sealing device containing compensatory means for decreasing the effect of high axial pressures on axle parts caused by improper fit, adjustment or design, whereby sealing pressures are held substantially constant and the seal life is increased. Pursuant to this object the novel sealing device is adapted to nullify losses in sealing usually encountered where the sealing device might be angularly displaced due to misalignment of parts or through the application of pressure in a plane not normal to the plane of its sealing surface.

A further object of the invention is to provide a sealing device which is radially flexible and comprises novel means for resiliently resisting torque due to relative rotation of the parts to which the sealing device is applied.

Still another object of the invention is to provide a fluid-tight seal comprising a flexible annular member formed on one radial side with a continuous flat narrow sealing face and having on its other side a rigid backing together with novel means acting on said backing for constant-urging said annular member in a sealing direction.

Further objects of the invention will presently appear as the description proceeds in conjunction with the appended claims and the annexed drawings wherein:

Figure 1 is a longitudinal sectional view of a fragmentary portion of an automotive wheel hub and axle assembly illustrating the use of a lubricant sealing device according to a preferred embodiment of the invention;

Figure 2 is an enlarged fragmentary sectional view of the sealing device of Figure 1 illustrating details of its construction;

Figure 3 is an exploded view illustrating the various component parts of the sealing device of Figures 1 and 2;

Figure 4:
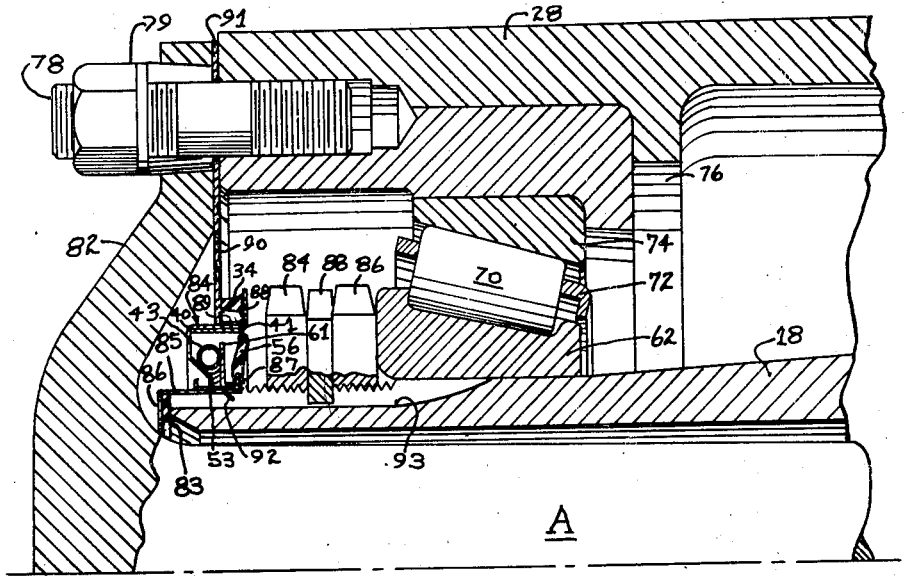
Figure 4 is a longitudinal sectional view of a fragmentary portion of an automotive wheel hub journal showing a further embodiment of the sealing device of the invention, particularly adapted for use as an outer hub seal in an axle.

The sealing device of my invention primarily embodies an annular body member of resilient material such as natural or synthetic rubber having a relatively flat narrow sealing face on one end and a rigid flat backing in a plane parallel to the face at the end opposite the face. By this construction I insure that forces arising from end play, misalignment, eccentricity and the like in the relatively rotatable parts are maintained generally axially of the sealing device and substantially perpendicular to the plane of the face, and the face is not inclined to wear along one edge. The opposite edges of the face are preferably sharp for affording a definite control over admission and retention of a lubricating film between the face and the cooperating relatively rotatable surface. The unit pressure at the face is kept as low as the degree of sealing required, and is not permitted to become so high as to destroy the lubricating film for the face or create damaging friction.

The sealing device of the invention, more specifically, comprises a rubber or like annulus, preferably of oil resistant material, having a full annular backing of rigid material such as an annular metal member vulcanized thereto. This rigid annular member is mounted on one of the relatively rotatable parts. The resilient annulus preferably comprises a thickened body portion and an integral axially projecting flange portion which is of smaller cross-section than the body so that it is flexible radially of the axle, and this flange is formed at its end with a narrow flat smooth annular sharp-edged sealing face adapted to slidingly engage a corresponding machined flat smooth radial surface on the other relatively rotatable part. The flange functions as a radially flexible arm during axial misalignment between the relatively rotatable parts and flexes between the sealing face and body in such fashion that the sealing face does not shift radially or become deformed, the effective seal remaining as if there was no misalignment.

The axial resiliency of the flange absorbs or otherwise compensates for variations in sealing pressure and continuously maintains the sealing face against its associated sealing surface.

The nature and advantages of sealing devices comprising such resilient annular members having narrow sharp-edged sealing faces and rigid backing and wherein the flange between the face and backing functions as a flexible mounting for the sealing face are fully described in my above-mentioned patent which claims those novel features. The present invention is concerned primarily with special arrangements for supplementing and aiding the rigidly backed resilient annulus in maintaining constant pressure on the sealing face under conditions likely to be encountered in service, and in its preferred embodiment comprises a special mount for the rigidly backed annulus adapted to constantly urge the annulus in a sealing direction and to resist and absorb torque arising from relative rotation of the contacting parts.

With continued reference to the drawings and more particularly to Figures 1, 2 and 3 which illustrate the invention as applied to the end of a drive axle, numeral 11 generally refers to a preferred embodiment of the improved sealing device.

In its operative association in the installation shown in Figures 1, 2 and 3, sealing device 11 is mounted on an annular spacer ring 12 inserted between a shoulder on the axle housing and an inner roller bearing race 14. The shoulder may, for example, be the end of a bearing sleeve receiving boss 16 of the axle housing surrounding an inserted wheel bearing sleeve 18 upon which bearing race 14 is mounted.

Inner bearing race 14 carries a series of tapered rollers 20 mounted in a roller spacing cage 22, and these rollers support an outer bearing race 24 seated in an annular recess 26 in the inner end of a wheel hub 28.

An annular member 30 is fixed to the hub, as by cap screws 32, and provides a flat smooth radially directed rigid sealing face 31 normal to the axis of the axle shaft A and adapted to be engaged by the sealing face of seal 11.

Sealing device 11 comprises an annular resilient body 34 provided with a smooth sealing face 35 adapted to engage smooth face 31 on member 30 to provide the lubricant seal.

Preferably, sealing device 11 is enclosed by a suitable shield or housing 36 which protects it from dust and water and may also function to prevent any lubricant accidently leaking past the seal from entering the brake mechanism of the vehicle.

Sealing device 11 is mounted in operative position between member 30 and a radial shoulder 38 on supporting ring 12.

The details of construction of my improved sealing device are more particularly illustrated in Figures 2 and 3, the latter illustrating that sealing device 11 comprises four separable parts consisting of three interfitting annular units 40, 41 and 42 and a spring annulus 43.

Member 40 is preferably of sheet metal and comprises a radial flat wall 44 lying in a plane normal to the axis of shaft A and serving as a rigid backing for resilient annulus 34 to which it is bonded as by vulcanization. a cylindrical outer rim 45, an inclined wall 46 extending from the inner edge of wall 44 away from annulus 34, and an inturned short flange 47 at the inner end of wall 46 parallel to wall 44. Preferably wall 46 is inclined at an angle of 45° to wall 44 but any suitable angle may be selected depending on space considerations and the desired wedging action.

Resilient body member 34 comprises an annulus of synthetic rubber or the like formed with the relatively narrow continuous flat smooth sealing face 35 which is peripherally bounded by sharp inner and outer corners 48 and 49. The thickened body 51 of annulus 34 is bonded to wall 44 over an area greater than the thickness of intermediate flange 52, so that flange 52 besides being axially resilient acts as a radially flexible support for sealing face 35.

Annular member 41, which is secured upon ring 12, is a composite part consisting of a flat cylindrical base 53 adapted to surround ring 12, an out-turned short flange 54 at one end of base 53 adapted to engage flange 47 of member 40, an outwardly extending wall 55 at the other end of base 53, an annular wall section 56 of synthetic rubber or like resilient material comprising a substantial continuation of wall 55, and an outer cylindrical rim 57 adapted to fit snugly and tightly with a press fit within rim 45 of member 40 and having an inturned end flange 58 secured to the outer periphery of flexible wall section 56.

The third separable annular member 42 is a sheet metal stamping generally L-shaped in cross section and consisting of a cylindrical wall 59 adapted to snugly and tightly fit upon the exterior of base 53 of member 41 and an outwardly extending flat wall 61 lying in a plane perpendicular to the axis of axle A. If desired, extra member 42 could be eliminated by making wall 61 rigid or integral with base 53 of member 41. Member 42 is always wholly within the enclosure provided by interfitting members 40 and 41 in the assembly, and spring 43 is disposed internally of the assembly between inclined wall 46 of member 40 and the flat radial face of wall 61.

In the assembly illustrated in Figure 2, the axial length of wall 59 of member 42 determines the axial position of wall 61, wall 55 of member 41 serving as a stop. A conical camming surface is afforded by inclined wall 46, and spring 43 which is radially contractible constantly exerts a wedging force between walls 46 and 61. If desired, walls 46 and 61 may assume any desired shape to provide the required wedging action by spring 43. Since wall 61 is effectively rigidly backed by shoulder 38 and ring 12, any radial contraction of annular spring 43 causes separational movement of member 40 away from member 41, this being permitted because they are slidingly engaged. The parts are illustrated in relaxed condition in Figure 2, the seal being an assembled unit ready for mounting on the axle and spring 43 having urged parts 40 and 41 to the limit of their separational movement as determined by stop flanges 47 and 54.

The resilient annular wall section 56, which is preferably of synthetic rubber and vulcanized to wall 55 and flange 58, flexes during relative axial displacement as illustrated in Figures 1 and 2, and also functions as a shear spring for resiliently absorbing torque arising from engagement of sealing face 35 with the other relatively rotatable part. Wall section 56 acts to completely seal off any lubricant which has entered the enclosure defined by members 40 and 41, and it provides a resilient buffer for extreme axial loads initiated by poor assembly or adjustment of the axle parts.

When in a free position (as in Figure 2) spring 56 is in shear to the left. However, in assembly (as in Figure 1), the outer rims 45 and 57 are forced to the right, so that the shear spring adds axially acting compressive force for added sealing pressure. In fact, even after wear of sealing face 35 has progressed to the stage where coil spring 43 is inoperative to increase sealing pressure, the shear spring will still act to maintain unit sealing pressure. Through the combined action of the coil and shear spring the seal in general resists extreme deformation and it will function normally under conditions of actual deformation rendering a conventional seal ineffectual.

In making the sealing device, members 40, 41 and 42 are preformed with resilient members 34 and 56 vulcanized in position as above described. Although these members, except for parts 34 and 56, are preferably sheet metal stampings, any suitable material may be employed.

As a first step in assembling the sealing device, member 42 is press fitted upon base 53 of member 41 so that these parts are rigidly secured together, wall 55 serving as a stop to locate planar wall 61 against which the spring 43 is disposed. Then spring 43 is mounted about base 53, and member 40 is telescoped with member 41 so that rims 45 and 57 are press fitted rigidly together, the limit of telescopic engagement of parts 40 and 41 being defined by abutment of rim 57 against wall 44. Also at this point flange 54 is turned over so as to provide a stop limiting relative axial movement of members 40 and 41. During assembly of members 40 and 41, spring 43 is radially expanded and put under tension and rides up onto inclined wall 46 into the position illustrated in Figure 2, where it exerts a constant wedging action urging members 40 and 41 apart.

The inner peripheral edge of flange 47 is slidably associated with base 53 so that, as permitted by resilient shear spring 56, member 40 may be displaced to the right in Figure 2 to the operational condition illustrated in Figure 1 where spring 43 is radially expanded even further due to the wedging action of inclined wall 46.

As mounted in operational position on the axle housing, the condition illustrated in Figure 1, spring 43 is riding relatively far out on inclined wall 46 and, since base 53 is backed by rigid shoulder 38, exerts a constant pressure on member 40 urging sealing face 35 against face 31. Spring 56 is thus supplemental to the resiliency of annulus 43. In this condition, shear spring 56 also acts with spring 43 and supplemental to the resiliency of annulus 34. Springs 43 and 56 thus have a compensatory or follow-up action as will further be explained.

In essence, since rims 45 and 57 are rigid with each other, the seal assembly comprises two circumferentially rigid annular members coupled by resilient annular wall section 56 which permits relative axial movement between the members and absorbs torque which might otherwise cause wind-up and axial shortening of annulus 34. It is further to be observed that relatively inclined walls 46 and 61 are rigid with the respective members and that the wedging action of spring 43 tends to constantly urge the members apart so that when the seal is not mounted in its operative condition in a machine, it is fully expanded axially.

Resilient annulus 34 is relatively thin in cross section and flange 52 is joined to the thicker body 51 by suitable inner and outer fillets. Member 34 is illustrated as tapered and increasing in thickness from sealing face 35 to body 51 but such taper is not essential to practice of the invention.

Member 40 has a sufficiently close fit with base 53 at the inner periphery of flange 47 to provide a relatively rigid radial backing and support for the attached resilient member 34, and member 34 is of such axial length that its sealing face 35 is adequately supported against radial distortion and will not tilt or roll on face 31, and will thus be kept flat with the edges at each side thereof maintained in a clean and sharp condition.

Flexible annulus wall section or shear spring 56 is preferably so constructed that it has a natural tendency to assume the shape shown in Figure 2. When the sealing device is mounted in operative position on the axle, member 56 is distorted to the shape shown in Figure 1 in which it augments the axial force exerted by spring 43 to apply sealing pressure.

When the sealing device is first mounted on the axle, spring 43 is disposed near the outer edge of inclined wall 46 (Figure 1), and as the member 34 wears back at face 35, spring 43 gradually contracts inwardly compensating for the wear and urging member 34 toward face 31. Spring 43 is especially designed to exert a substantially uniform axially directed force over the operative range encountered in the sealing device.

Lubricant from the lubricant containing space between hub 28 and sleeve 18 may enter the interior of sealing device 11 between base 53 and flange 47 to provide lubricant for spring 43 and the sliding engagement of flange 47 with base 53 but is precluded from leaving the sealing device at the other side.

My invention above described provides a sealing device which includes and obtains all the advantages of the seal disclosed in the above-identified patent and provides further means for maintaining sealing pressure by compensating for wear and absorbing torque due to relative rotation of the parts and thereby prevents wind-up and axial shortening of the seal. At all times during normal operation the narrow smooth sealing face 35 is maintained under constant pressure against face 31, the degree of sealing pressure permitting the existence of a lubricating film between face 35 and face 31 and the sharp edges 48, 49 providing maximum sealing face area for the thickness of annulus 34 and preventing passage of lubricant outwardly of the seal.

Shear spring 56 not only supplements the action of spring 43 but provides a resilient buffer for extreme axial loads caused by poor adjustment of the relatively rotatable parts.

The sealing device is simple in construction and easy to assemble. The specific structure above described may be altered as desired to provide any suitable axially directing pressure device equivalent to spring 43 and its associated wedge surfaces or any structure functionally equivalent to member 56 without departing from the spirit of the invention.

While spring 43 is preferably a toroidal member made of coiled relatively small wire, it may assume any shape capable of accomplishing its intended function.

The sealing device of the invention is capable of compensatory axial movement over a wide range, and the face 35 of annulus 34 does not shift or rock due to misalignment, because of the flexure of flange 52 during operation. Torsional forces exerted on annulus 34 are transmitted through rigid wall members in the seal to resilient section 56 which has sufficient resistance in rotational shear to prevent any substantial rotational movement between members 40 and 41.

In the embodiment illustrated in Figure 4, the sealing device of the invention provides an outer hub seal, whereas the embodiment illustrated in Figures 1, 2 and 3 is an inner hub seal.

At the outer end of hub 28 an inner bearing race 62 is mounted on the outer end of sleeve 18 and carries a plurality of anti-friction roller elements 70, spaced by a roller cage 72 and cooperating with an outer bearing race 74 fixed in an annular recess in an outer retainer ring carrier 76 mounted in the outer end of hub 28 and secured in position as by stud bolts 78. Axle shaft A extends through sleeve 18 and is provided beyond the sleeve with a flange 82 non-rotatably secured to hub 28 by stud bolts 78 and cooperating nut and washer means at 79. The inner bearing race 62 is held in operative position on sleeve 18 by suitable nuts 84 and 86 and cooperating lock washer 88. As this is all conventional axle construction, further description thereof is considered unnecessary for the purpose of this disclosure.

The outer extremity of axle shaft A has bonded to it, as by vulcanization, an annulus 83 of rubber or the like, the purpose of which will presently appear. A sealing device 84, functionally the same as but of slightly different structure from sealing device 11, is mounted on the axle shaft just inwardly of annulus 83.

A cylindrical band 85, preferably a metal stamping, having an inturned circumferential flange 86 extending over annulus 83 and an out-turned short circumferential flange 87 is snugly but not tightly fitted onto the cylindrical end of shaft A. Band 85 provides a mounting for sealing device 84 which is substantially exactly the same as sealing device 11 except that instead of being mounted on side wall 44 the resilient annulus 34 has its body 51 vulcanized to a flat radial backing plate 88 disposed normal to the axis of axle A and having a circumferential flange 89 fixed as by spot welding to rim 45 of annular member 40.

Also shear spring 56 is of larger radial extent in Figure 4, wall 55 of member 44 being correspondingly shorter, to provide for increased axial deformation.

The narrow sealing face 35 of annulus 34 bears against the flat inner face 90 of a rigid annular sealing plate 91 which is clamped between flange 82 and hub 28.

Base 53 of annular seal member 41 is press fitted over band 85 until stopped by flange 87. Band 85 is formed with an inwardly struck tongue 92 extending into the usual milled keyway 93 on the axle shaft end.

The seal of Figure 4 is the same in function as that of Figure 1, and is the same in structure except for larger shear spring 56, the relocation of sealing annulus 34 to suit the space and structural limitations, and the novel buffer mounting for the sealing device afforded by band 85 and resilient annulus 83. Buffer 83 acts to augment the action of shear spring 56 in taking torque in addition to cushioning the sealing device 84 from axial shock. Otherwise what has been said for the embodiment of Figure 1 applies to Figure 4, the seal of Figure 4 acting of course in the opposite direction to seal 11 to prevent escape of lubricant and ingress of dust, dirt and moisture.

As the outer end of the hub is subject to somewhat greater deflection than the inner end and is also subject to the cumulative effects of imperfections in construction and adjustment, outer seal 84 has been made even more flexible than inner seal 11. Mounting band 85 is so dimensioned as to be axially movable within restricted limits on the end of sleeve 18, and the resilient buffer 83 resiliently resists such axial movement of band 85 relative to sleeve 18. Plate 90 may also be somewhat flexible to assist, within relatively narrow limits, in maintaining a substantially constant axial pressure between itself and the sealing annulus 34.

Figure 5:
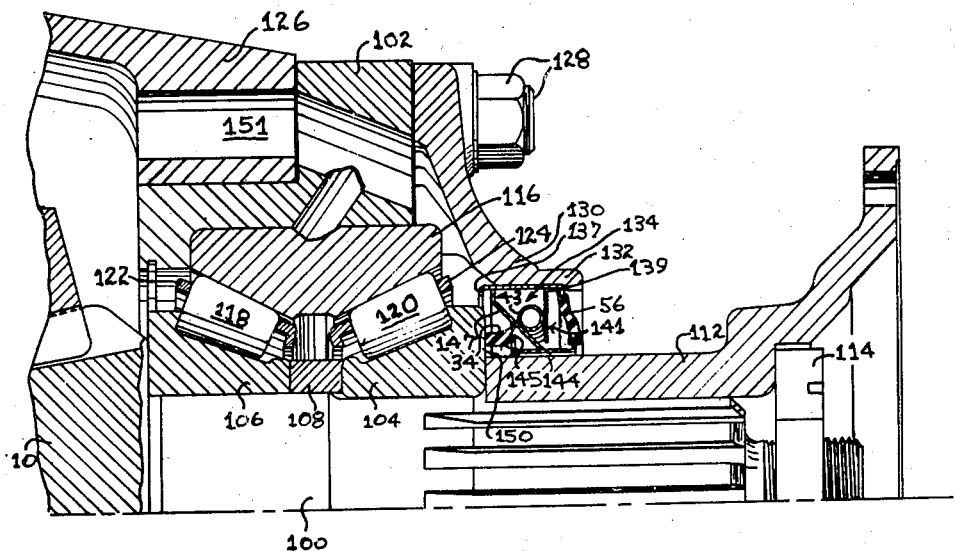
Figure 5 is a longitudinal sectional view of a fragmentary portion of an automotive axle differential illustrating therewith a still further embodiment of the sealing device of the invention of especial design for the purpose.

Figure 5 illustrates the manner in which the improved sealing device of the invention may be used to preclude the escape of lubricant around the pinion shaft of an axle differential assembly.

In this arrangement the pinion shaft 100 is journalled in an outer bearing race carrying ring or nose section 102 by a roller bearing assembly having a pair of inner race members 104 and 106 mounted on the pinion shaft with a spacing ring 108 between them and held in operative position between the rear face of pinion gear 110 and the splined inner end of universal joint flange 112 by a nut 114 threaded upon the outer end of the pinion shaft and bearing against an internal shoulder in the universal joint flange in a manner well known to the art.

An outer bearing race 116 is mounted in an annular recess in carrier ring 102 and two sets of roller bearings, as indicated at 118 and 120, are disposed between the inner and outer races and held in spaced position by the respective cage members 122 and 124. The outer bearing carrier ring 102 is provided with a pilot flange seated in an aperture in the differential housing 126 and is held in place by suitable bolts 128, which also secure a pinion cage cover 130 against the outer surface of carrier ring 102. Cover 130 partly overlies the bearing assembly and is provided with an apertured boss 132 which surrounds the cylindrical hub portion of universal joint flange 112 and is annularly spaced therefrom, and a sealing device, generally indicated at 134 and particularly illustrated in Figure 6, is mounted in this annular space and secured to the inner surface of the cover plate boss.

Figure 6:
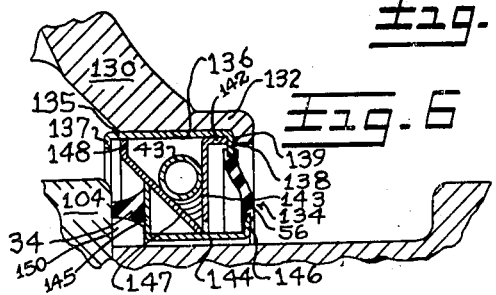
Figure 6 is a sectional view on an enlarged scale of the sealing device of Figure 5.

The oil seal device, generally indicated at 134 and illustrated in detail at Figure 6, is provided for precluding leakage of lubricant around the pinion shaft.

Sealing device 134, as illustrated in Figure 6, comprises a cylindrical band 135, preferably a metal stamping, adapted to be press fitted within an annular internal shouldered recess 136 in hub 132. Band 135 is integrally formed with inturned circumferential flanges 137 and 138 at opposite sides, flange 138 abutting against shoulder 139 of recess 136.

An annular member 141, L-shaped in cross section and similar to member 42 of Figure 1, although reversed therefrom, is formed with a cylindrical leg 142 press fitted tightly within band 135 and a flat radial wall 143 extending interiorly of the seal normal to the axis of shaft 100. Wall 142 corresponds to wall 61 in Figure 2.

A second annular band 144, also preferably a metal stamping, is formed with an inturned radially flat end wall 145 which serves as a rigid backing for resilient annulus 34 and lies in a plane normal to the shaft axis and parallel to face 35 of annulus 34. At its other side, band 144 is formed with an inwardly turned end wall 146, similar to wall 55 in Figure 2, and resilient annular shear spring 56 is bonded at inner and outer peripheries to wall 146 and flange 138.

A substantially conical ring 147, providing an inclined wall similar to wall 46 in Figure 1, is fixed as by welding at its inner end to an intermediate part of band 144 and also fixed intermediate its ends to the outer edge of wall 145, and is formed at its outer end with a circumferential flange 148 adapted to cooperate with flange 137. The outer periphery of flange 148 has a sliding fit with band 135 so as to permit axial deformation of the seal.

The spring 43 is provided to exert its constant wedging action between radial wall 143 and inclined wall 147, as in the other embodiments of the invention. The seal of Figure 5 is thus the same as that of Figures 1 and 4 except that the former is constructed to be carried by inside diameters whereas the latter are carried by outside diameters.

By reason of the above arrangement wherein sealing face 35 of annulus 34 bears against the rotating radial flat face 150 of bearing race 104, lubricant emerging from the bearing assembly or coming through passage 151 is sealed against outward leakage. Aside from this reversal of structure it functions similarly to the previously described embodiments.

My invention therefore provides a simple, easily manufactured, durably constructed oil seal, which, by virtue of its resiliently acting compensatory or follow-up action to take care of axial deformation beyond the range of the resiliency of annulus 34, eliminates the effect of poorly adjusted or designed relatively rotatable axle parts and frictional wear, thus securing a long life at a continued high level of efficiency.

In addition, the seal is self-lubricating, utilizing the oil in the adjacent journal assembly; and it acts through its shear spring to absorb torque forces, resist extreme axial deformation and completely block the escape of lubricant.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid tight seal adapted to be interposed between two relatively rotatable parts comprising an axially resilient, radially flexible annulus formed with an axially directed narrow flat sealing face having sharp edges and adapted to contact a parallel sealing face on one of said parts, a radial wall rigidly backing said annulus, an annular base member adapted to be fixed to the other of said relatively rotatable parts, and axially expansible and contractible means interconnecting said radial wall and said base member comprising a pair of circumferentially extending walls inclined at an angle to each other and fixed respectively to said radial wall and said base member so as to provide a radially outwardly diverging mouth, and an expansible and contractible annular spring mounted in said mouth with its opposite sides contacting said relatively inclined walls.

2. An annular seal for relatively rotatable parts comprising a circumferentially rigid annular base member adapted to be fixed to one of said parts, a second circumferentially rigid annular member substantially coextensive and concentric therewith, a fluid-tight annular resilient wall section on said seal interconnecting said members for permitting relative axial movement therebetween, an internal radial wall rigid with one of said members and an internal inclined wall rigid with the other of said members, said internal walls being disposed in radially outwardly diverging relation, an annular spring within said seal between said walls tending to urge said members apart axially, an axially facing external wall on said second member, and an axially resilient and radially flexible annulus fixed to said external wall having an axially facing flat narrow sealing face adapted to contact the other of said relatively rotatable parts.

3. In the seal defined in claim 2, said inclined internal wall terminating in an internal annular edge slidable upon said base member, and the space between said edge and the base affording ingress for lubricant to lubricate said seal internally.

4. In a fluid-tight seal for relatively rotating parts, an annular base member adapted to be attached to one of said parts, an annular member generally surrounding said base member, a flexible annulus interconnecting said members for permitting limited relative axial displacement between them, an annular body of resilient material secured to said annular member and projecting therefrom, said resilient body having a flat axially directed sealing face adapted to engage the other of said parts, and means within said seal enclosed by said members for resiliently urging said members apart in the axial direction.

5. In the seal defined in claim 4, said members being of sheet metal and said flexible annulus comprising a ring of resilient material interconnecting coextensive adjacent edges of said members.

LAWRENCE R. BUCKENDALE.

REFERENCES CITED

The following references are of record in the file of this patent:

UNITED STATES PATENTS

| Number | Name | Date |
|---|---|---|
| 849,576 | Schulz | Apr. 9, 1907 |
| 2,021,346 | Allen | Nov. 19, 1935 |
| 2,224,449 | Schmied | Dec. 10, 1940 |
| 2,233,624 | Magnesen | Mar. 4, 1941 |
| 2,243,227 | Stratton | May 27, 1941 |
| 2,311,494 | Vedovell | Feb. 16, 1943 |
| 2,373,443 | Armington | Apr. 10, 1945 |

FOREIGN PATENTS

| Number | Country | Date |
|---|---|---|
| 549,337 | Great Britain | 1942 |